(12) United States Patent
Stringham et al.

(10) Patent No.: US 7,107,368 B2
(45) Date of Patent: Sep. 12, 2006

(54) SYSTEMS AND METHODS FOR PRINTING

(75) Inventors: Gary G. Stringham, Boise, ID (US); Todd Alexander Lutz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 233 days.

(21) Appl. No.: 10/142,103

(22) Filed: May 8, 2002

(65) Prior Publication Data

US 2003/0210423 A1    Nov. 13, 2003

(51) Int. Cl.
*G06F 13/12*    (2006.01)

(52) U.S. Cl. .............................. 710/62; 710/8; 710/15; 358/1.1; 358/1.6

(58) Field of Classification Search ................. 710/62, 710/64, 67, 72; 709/203
See application file for complete search history.

(56) References Cited

U.S. PATENT DOCUMENTS

| | | | |
|---|---|---|---|
| 6,577,407 B1 * | 6/2003 | Kopecki | 358/1.15 |
| 6,629,642 B1 * | 10/2003 | Swartz et al. | 235/462.46 |
| 6,654,651 B1 * | 11/2003 | Ashida et al. | 700/83 |
| 6,655,593 B1 * | 12/2003 | Alleshouse | 235/462.01 |
| 6,676,310 B1 * | 1/2004 | Simpson et al. | 400/61 |
| 6,690,777 B1 * | 2/2004 | Pecht | 379/100.01 |
| 6,765,688 B1 * | 7/2004 | Claiborne | 358/1.18 |
| 6,778,289 B1 * | 8/2004 | Iwata | 358/1.15 |
| 6,791,702 B1 * | 9/2004 | Tanaka | 358/1.13 |
| 6,831,754 B1 * | 12/2004 | Delaney | 358/1.15 |
| 2002/0184378 A1 * | 12/2002 | Pineau et al. | 709/230 |

* cited by examiner

*Primary Examiner*—Fritz Fleming
*Assistant Examiner*—Niketa I. Patel (57) ABSTRACT

Systems and methods for printing are disclosed. In one arrangement, the systems and methods pertain to receiving information with a printing device regarding the location of data to be printed by the printing device, obtaining the data to be printed via a network, and printing the data as a hard copy document.

3 Claims, 6 Drawing Sheets

SYSTEMS AND METHODS FOR PRINTING

FIELD OF THE INVENTION

The present disclosure relates to network file printing. More particularly, the disclosure relates to systems and methods for printing network-accessible files.

BACKGROUND OF THE INVENTION

Many different types of printing devices are available in today's market. These printing devices range from conventional printers to devices that are capable of multiple functionalities including multifunction peripherals (MFPs), all-in-one devices, etc.

Often, these printing devices are network-enabled and therefore can receive and/or transmit data over a network such as a local area network (LAN) as well as the Internet. Many of these printing devices include user interface devices, such as QWERTY keyboards, that allow the user to enter specific information into the printing device. Despite these capabilities, files stored on a network normally still can only be printed by the printing device if provided to the printing device by a suitable host device, such as a personal computer (PC). Accordingly, even though the user may know the address of a printable, network-accessible file and is able to enter information into the printing device with a given interface device, and despite the fact that the printing device is capable of network communication, the printing device cannot be used to print the file without the user first facilitating its delivery to the device using a host device. If the printing device were capable of receiving identification of the file location and retrieving the file, the printing device could be used as a stand-alone device, thereby permitting use of the printing device in many new applications.

SUMMARY OF THE INVENTION

The present disclosure relates to systems and methods for printing. In one arrangement, the systems and methods pertain to receiving information with a printing device regarding the location of data to be printed by the printing device, obtaining the data to be printed via a network, and printing the data as a hard copy document.

In addition, the present disclosure relates to printing devices. In one arrangement, the printing devices comprise an input device configured to receive information regarding the location of data to be printed, and memory including a network transfer manager configured to identify a network address of the data to be printed, facilitate retrieval of the data to be printed, and facilitate printing of the data.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed herein are systems and methods for printing network-accessible files using a printing device. With these systems and methods, a user can, without needing to first access a host device, identify one or more files stored on a network that the user would like to print and have the printing device generate a hard copy document of the file. To facilitate description of the invention, an example system is first discussed with reference to the figures. Although this system and its various components are described in detail, it will be appreciated that this system is provided for purposes of illustration only and that various modifications are feasible. After the example system has been described, examples of operation of the system are provided to explain the manners in which network-accessible file printing can be achieved.

Figure 1:
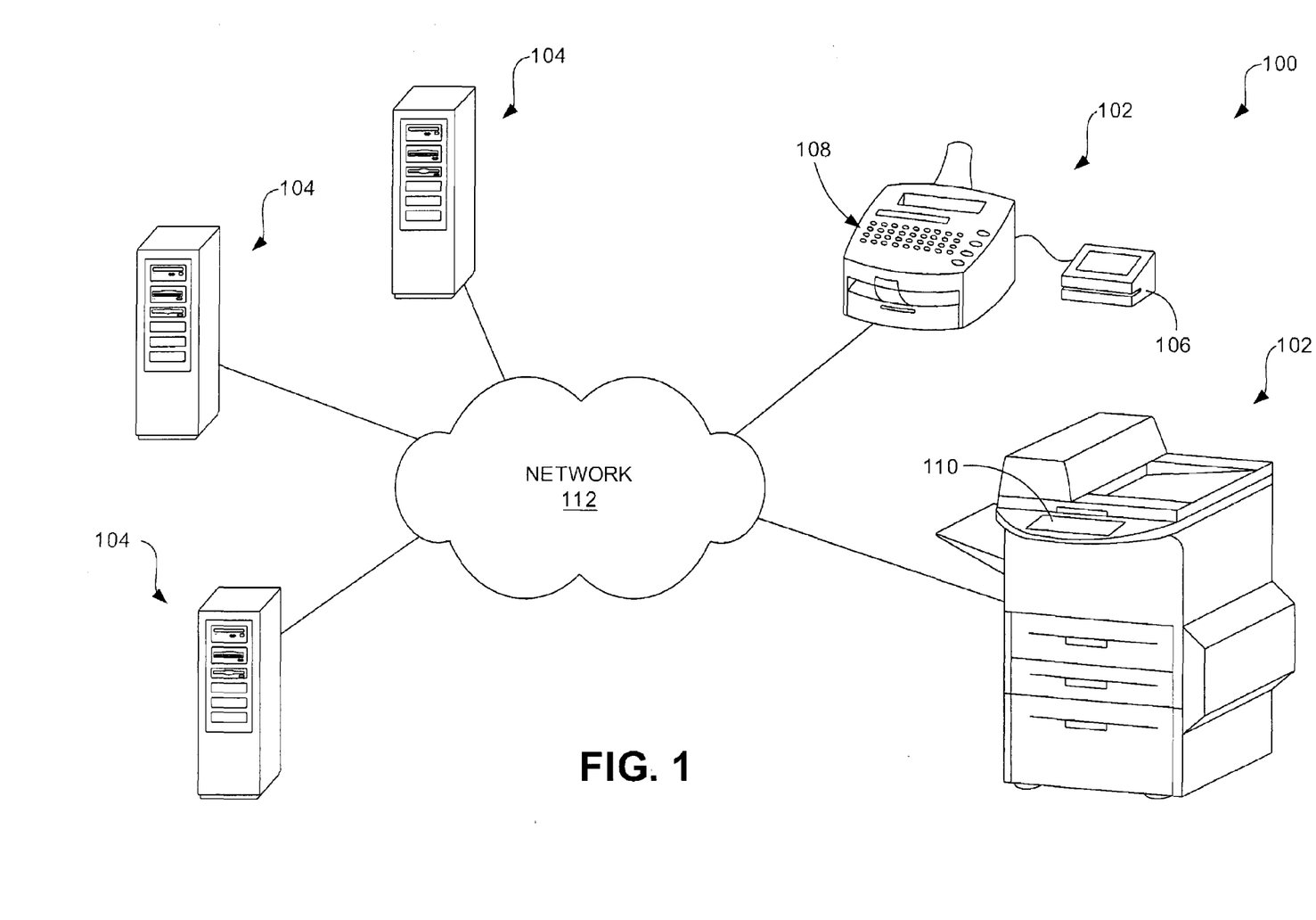
FIG. 1 is a schematic view of an example system in which the invention can be implemented.

Referring now in more detail to FIG. 1, illustrated is an example system 100 in which the invention can be implemented. As indicated in this figure, the system 100 generally comprises one or more printing devices 102 and one or more computing devices 104. Generally speaking, the printing devices 102 comprise any network-enabled imaging device that is capable of generating hard copy documents. Accordingly, the printing devices 102 can comprise a printer, a multifunction peripheral (MFP), an all-in-one device, etc. As is discussed in greater detail below, each of the printing devices 102 includes one or more input devices that can be used to input information regarding network-accessible files that are to be printed. By way of example, the input devices can comprise an auxiliary input device such as device 106, or a integral input device that comprises part of the printing device control panel such as a keyboard 108 or a touch-sensitive screen 110.

The computing devices 104 can comprise any network-enabled device that stores data, typically in the form of one or more files, that may form the basis for print jobs to be completed by one or more of the printing devices 102. By way of example, the computing devices 104 comprise a mainframe computer, a server, a personal computer (PC), etc. Although "computing devices" have been identified herein, persons having ordinary skill in the art will appreciate from the discussions that follow that other network-accessible devices capable of storing data may be used.

As is further identified in FIG. 1, the printing devices 102 and computing devices 104 are connected to a network 112. The network 112 typically comprises one or more sub-networks that are communicatively coupled to each other. By way of example, these networks include one or more local area networks (LANs) and/or wide area networks (WANs). Indeed, in some embodiments, the network 112 may comprise a set of networks that forms part of the Internet. Optionally, one or more of the computing devices 104 can be directly connected to one or more of the printing devices 102, if desired.

Figure 2:
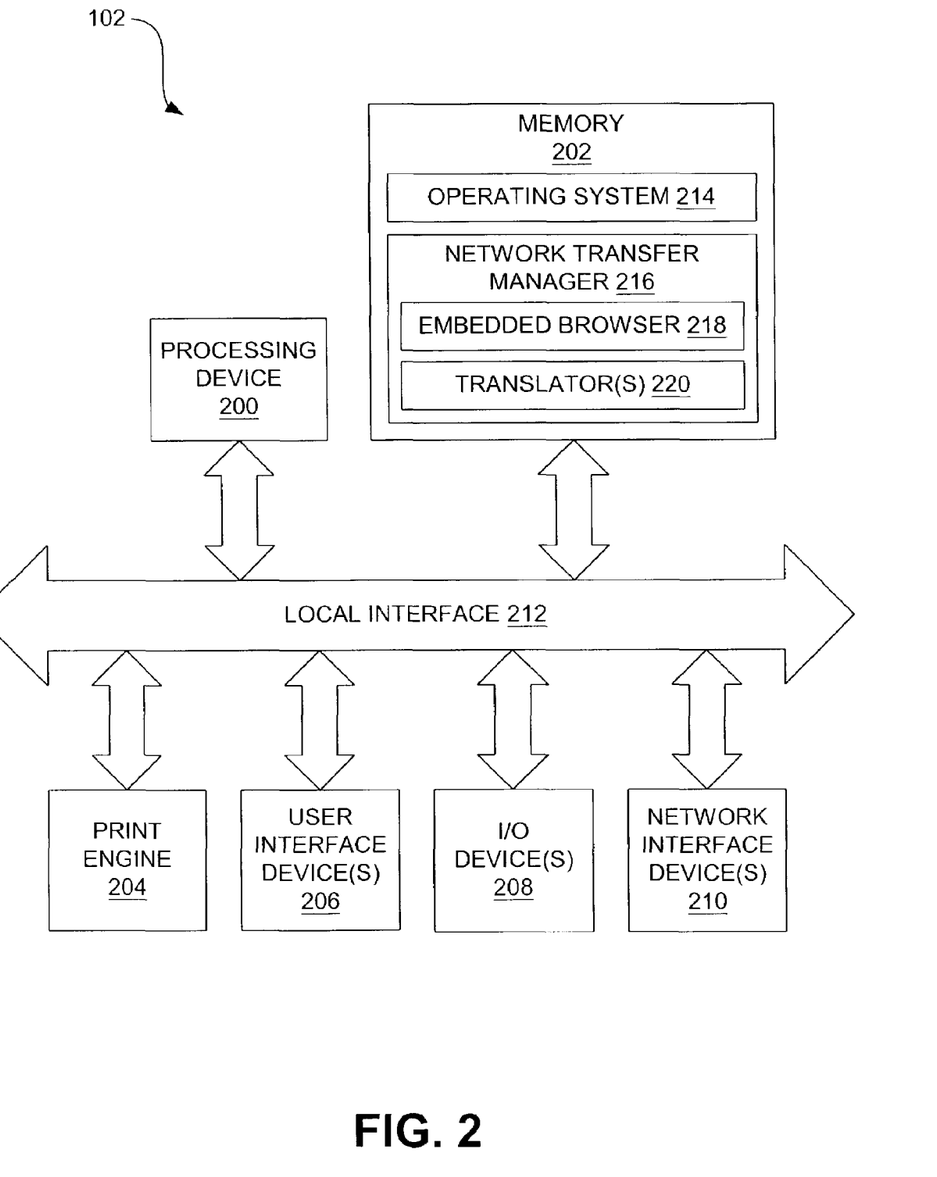
FIG. 2 is a block diagram of an example configuration for a printing device shown in FIG. 1.

FIG. 2 is a block diagram of an example configuration for one or more of the printing devices 102 shown in FIG. 1. As indicated in FIG. 2, each printing device 104 can, for instance, comprise a processing device 200, memory 202, a print engine 204, one or more user interface devices 206, one or more input/output (I/O) devices 208, and one or more network interface devices 210. Each of these components is connected to a local interface 212 that, by way of example, comprises one or more internal buses. The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the printing device 102. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The print engine 204 comprises the various components with which the printing device 102 generates hard copy documents. Accordingly, the print engine 204 can comprise, for instance, a print medium drive mechanism, a photoconductor drum, a developing roller, fusing system, etc.

The one or more user interface devices 206 comprise interface tools with which the device settings can be changed and through which the user can communicate commands directly to the printing device 102. As identified above with reference to FIG. 1, these interface devices 206 normally include an auxiliary or integral input device via which information can be input regarding one or more network-accessible files that are to be printed. Whether separate from or integral to the printing device 102, the input device can comprise a plurality of keys (e.g., of a keyboard) that are used to enter alphanumeric characters, or a touch-sensitive screen (e.g., liquid crystal display) that is used to enter the characters. In the latter case, the touch-sensitive screen may present various "soft" keys to form a virtual keyboard with which information can be entered. Alternatively, the input device can comprise one or more buttons or other controls that are used to select items (e.g., network addresses) from a list. In a further alternative, the input device can comprise an auditory input device, such as a microphone, with which information can be input audibly by the user.

In other embodiments, the input device (whether auxiliary or integral) can comprise a reading device that is configured to automatically read information from a suitable information source. For example, the input device can comprise a bar code reader that is configured to read bar codes, a two-dimensional code reader that is configured to read two-dimensional (e.g., dot pattern) codes, a card reader that is configured to read magnetic strips provided on data cards, a scanning device that is configured to optically character recognize (and therefore read) written text, etc. Accordingly, as can be appreciated from the above, the input device can comprise substantially any device with which information can be input into the printing device 102 by the user.

The one or more I/O devices 208 comprise components used to facilitate connection of the printing device 102 to other devices. These I/O devices 208 can, for instance, comprise one or more serial, parallel, small system interface (SCSI), universal serial bus (USB), IEEE 1394 (e.g., Firewire™), or personal area network (PAN) connection devices. The network interface devices 210 comprise the various components used to transmit and/or receive data over the network 112. By way of example, the network interface devices 210 include a device that can communicate both inputs and outputs, for instance, a network card, modulator/demodulator (e.g., modem), a radio frequency (RF) or other transceiver, a telephonic interface, a bridge, a router, etc.

The memory 202 includes various code (software and/or firmware) including an operating system 214 and a network transfer manager 216. The operating system 214 contains the various commands used to control the general operation of the printing device 102. The network transfer manager 216 is configured to facilitate printing of network-accessible files. Normally, this task entails retrieval of one or more network-accessible files after receiving identification of one or more network addresses, for example universal resource locators (URLs), of the files. To facilitate this retrieval, the network transfer manager 216 can include an embedded browser 218 that is used to traverse the network 112 and facilitate network transfer of files. Optionally, the network transfer manager 216 may further include one or more translators 220 that is/are used to translate the files into a format that can be directly manipulated by the printing device 102.

Figure 3:
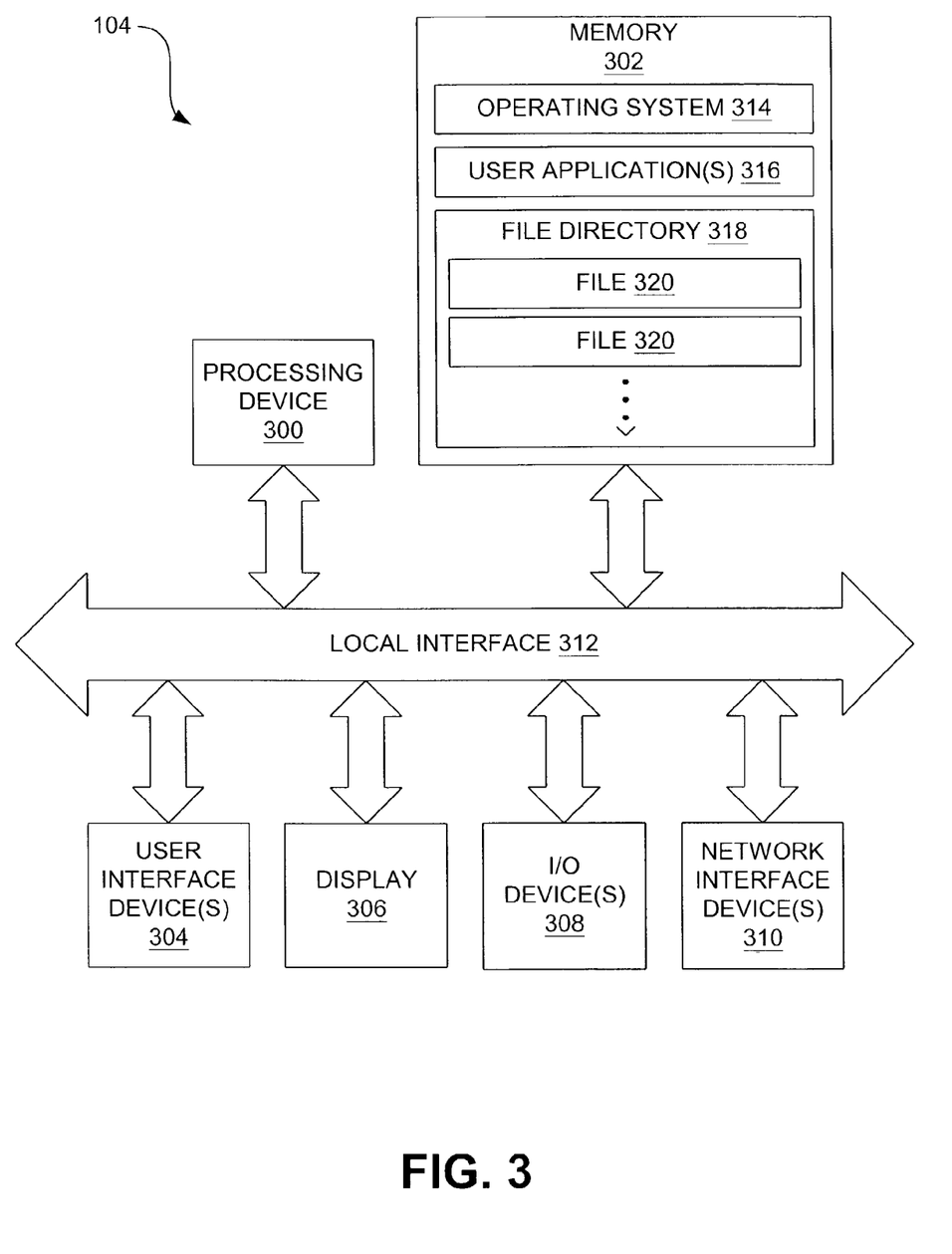
FIG. 3 is a block diagram of an example configuration for a computing device shown in FIG. 1.

FIG. 3 is a block diagram of an example arrangement for one or more of the computing devices 104 shown in FIG. 1. As indicated in FIG. 3, each computing device 104 can, for instance, comprise a processing device 300, memory 302, one or more user interface devices 304, a display 306, one or more I/O devices 308, and one or more network interface devices 310, each of which is connected to a local interface 312. The processing device 300 can include any custom made or commercially available processor, a central processing unit (CPU) or an auxiliary processor among several processors associated with the computing device 104, a semiconductor based microprocessor (in the form of a microchip), or a macroprocessor. The memory 302 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 304 comprise the components with which the user can interact with the computing device 104. Where the computing device 104 comprises a PC or similar device, these components can comprise those typically used in conjunction with a PC such as a keyboard and mouse. The display 306 can comprise a display typically used in conjunction with a PC such as a computer monitor or plasma screen. Finally, the I/O devices 308 and network interface devices 310 can operate and have configurations similar to like-named components identified above with reference to FIG. 2.

The memory 302 normally comprises various programs in software and/or firmware including an operating system 314, one or more user applications 316, and a file directory 318 which includes one or more network-accessible files 320. The operating system 314 controls the execution of other software and provides scheduling, input-output control, file and data management, memory management, and communication control and related services. The user applications 316 comprise one or more applications that may be used to generate one or more files that, for instance, can be stored within the file directory 318. The file directory 318 can comprise an independent directory that is stored within memory 302 and used to store the various files 320. Alternatively, the file directory 318 can comprise part of a network-accessible destination (e.g., web site). In such a case, the files may comprise one or more hypertext markup language (HTML) files, image files, etc.

Various code has been identified above. It is to be understood that this code can be stored on any computer-readable medium for use by or in connection with any computer-related system or method. In the context of this document, a computer-readable medium is an electronic, magnetic, optical, or other physical device or means that can contain or store code (e.g., in the form of a computer program) for use by or in connection with a computer-related system or method. The code can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. The term "computer-readable medium" can be any means that can store, communicate, propagate, or transport the code for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable media include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, examples of operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

As noted above, the system 100 can be used to print network-accessible files. More specifically, with the system 100, users can use the printing devices 102 as stand-alone devices and directly provide information as to the location of one or more network-accessible files so that the files can be obtained and printed.

Figure 4:
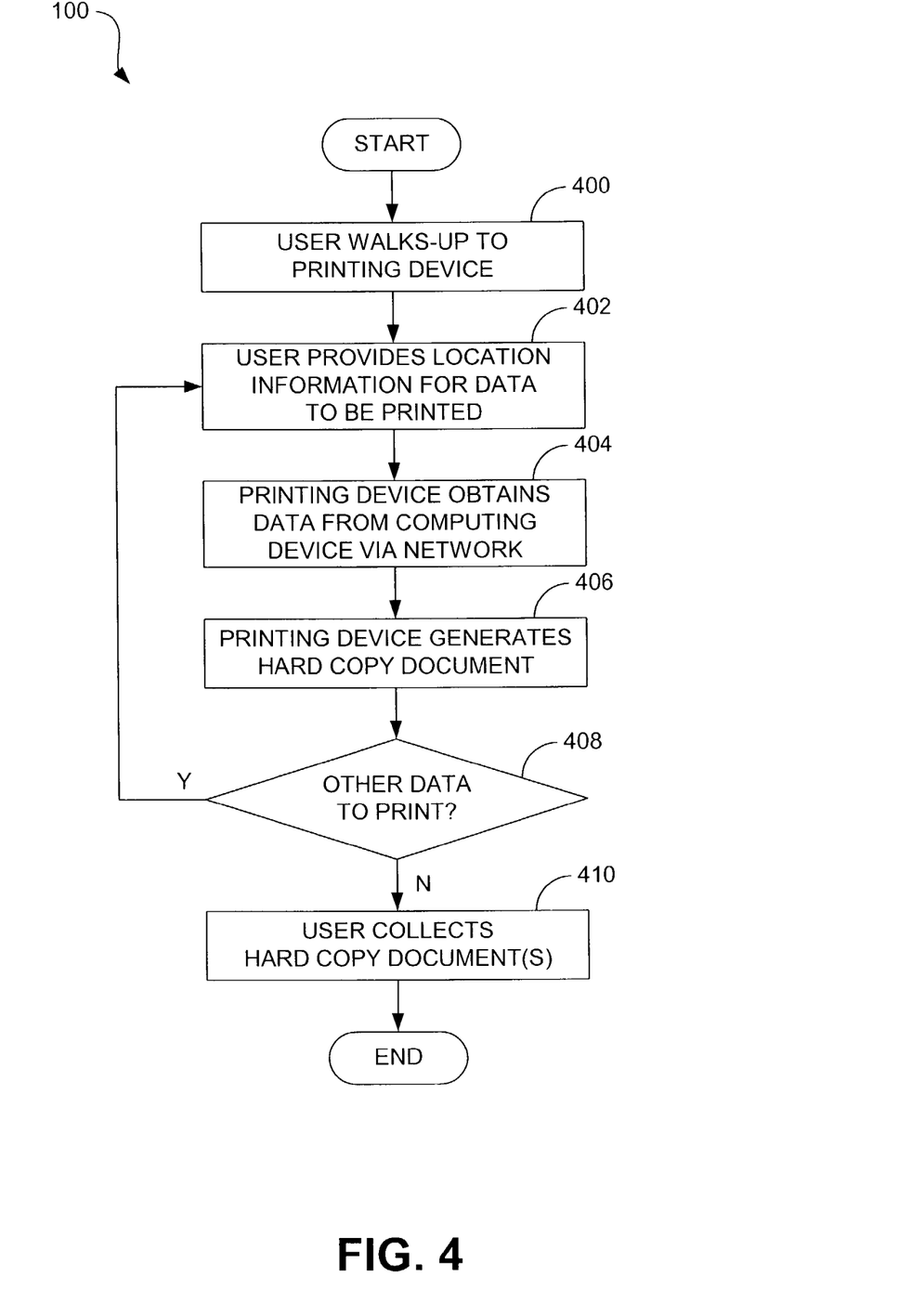
FIG. 4 is a flow diagram that illustrates an example of operation of the system shown in FIG. 1 in printing a file.

FIG. 4 provides an example overview of how the system 100 can be used to print network-accessible files. Beginning with block 400, the user first walks-up to, or otherwise approaches, the printing device 102. Next, the user provides location information for data that are to be printed, as indicated in block 402. By way of example, the data can comprise one or more network-accessible files, a network site or page (e.g., web site or web page), or other network-accessible data. For the purposes of this example, it is assumed that these data are stored on a computing device 104.

As mentioned above in the discussion regarding FIG. 2, the location information is provided to the printing device 102 using an input device of or associated with the printing device. The nature of the provision of the location information depends upon the nature of the input device used. For instance, the user may communicate the location information by typing in a network address (e.g., URL) of the data to be printed, speaking the address into the input device, having the input device read the address from an appropriate information source, etc.

Once this information has been provided, the printing device 102 can obtain the data from the computing device 104 that stores the data via the network 112, as indicated in block 404. After the data are obtained, the printing device 102 can then generate a hard copy document based upon the data, as indicated in block 406.

At this point, with reference to decision element 408, it can be determined whether other data are to be printed. If so, i.e., the user has other location information to share with the printing device 102, flow returns to block 402 and the information is again provided to the device. If, on the other hand, no other data are to be printed, the user may collect the hard copy document(s) printed by the printing device 102, as indicated in block 410, and flow for the session is terminated.

Figure 5:
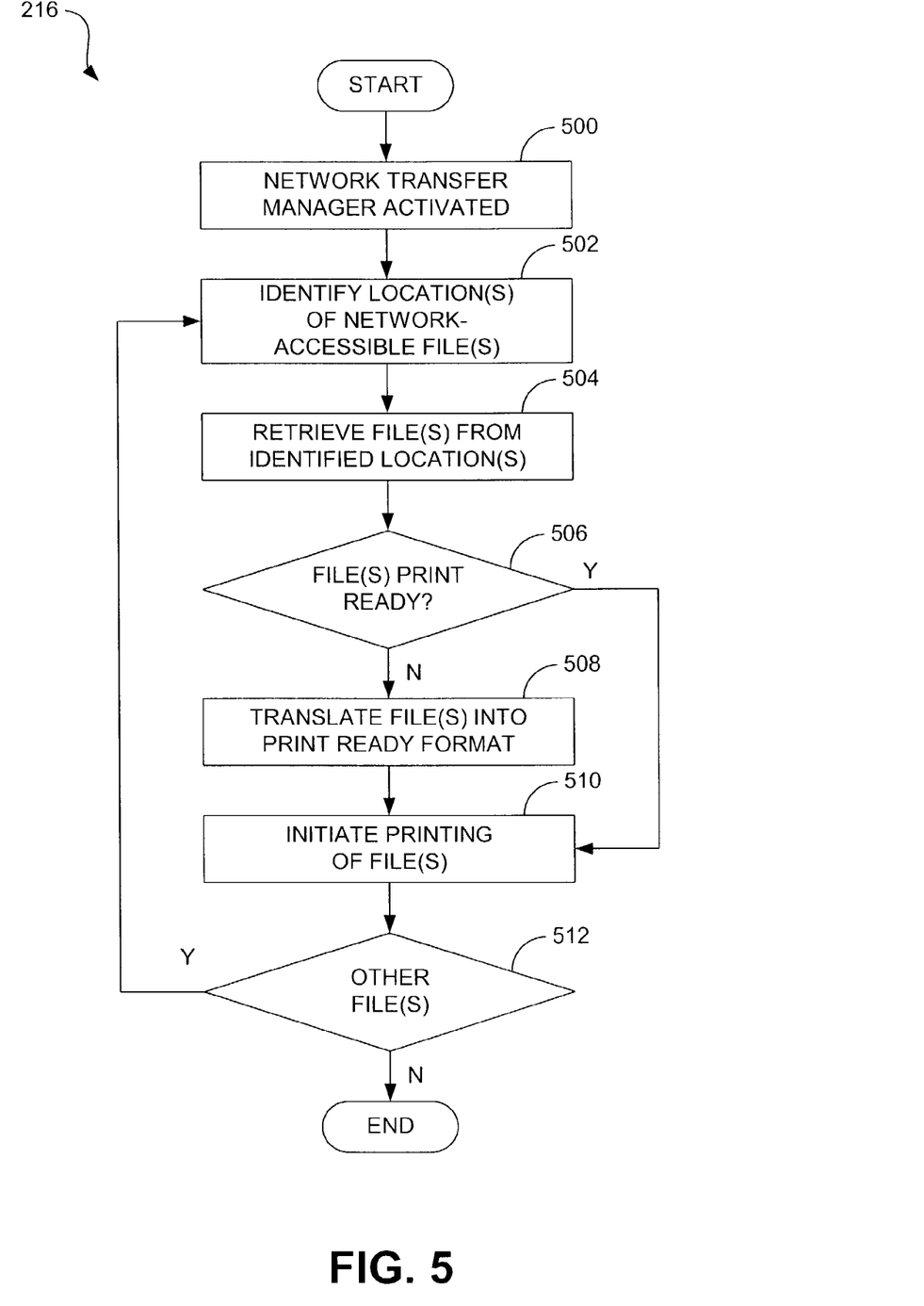
FIG. 5 is a flow diagram that illustrates a first example of operation of a network transfer manager of the printing device shown in FIG. 2.

FIG. 5 illustrates an example of operation of the network transfer manager 216 in facilitating printing in the manner described above in relation to FIG. 4. Beginning with block 500, the network transfer manager 216 is activated. Normally, this activation occurs in response to some action by the user. For instance, activation may occur upon entry by the user of a command to print a network-accessible file. In other cases, activation may occur automatically upon the user causing the input device to read an address from a suitable information source. In any case, once the network transfer manager 216 is activated, it can identify the location or locations of one or more network-accessible files, as indicated in block 502.

Once the location of a file has been identified, the network transfer manager 216 can retrieve the file from the identified location, as indicated in block 504. Normally, this retrieval entails requesting transmission of the file from the source that stores it (e.g., a computing device 104) through use of the embedded browser 218. After the file has been retrieved, it can be determined whether the file is in a print ready format, i.e. is in a format that the printing device uses internally and may therefore manipulate without some form of translation, as indicated in decision element 506. What constitutes a print ready file will depend upon the configuration of the printing device 102. By way of example, print ready files may include files in printer control language (PCL), page description language (PDL), portable document format (PDF), and the like.

If the file is print ready, flow continues down to block 510 discussed below. However, if the file is not print ready, the file is first translated into a print ready format, as indicated in block 508. This translation can be performed, for example, by a translator 220 of the network transfer manager 216. Alternatively, the translation may be out-sourced to a suitable translation service that is accessible over the network 112. In such a case, the file may be forwarded to the translation service, and a translated file (i.e., a print ready file) received back from the service.

Once the file has been translated, or if the file was originally in a print ready format, the network transfer manager 216 initiates the printing process so that a hard copy document of the file is generated by the printing device 102, as indicated in block 510. At this point, it can be determined whether other files are to be retrieved and printed, as indicated in decision element 512. If so, flow returns to block 502 and the above-described process is repeated. If not, however, flow is terminated for the manager 216.

With the mode of operation described above, printing devices can be used in various novel applications. For example, companies could distribute sheets of paper or other media that comprise one or more codes (e.g., bar codes, two-dimensional codes, etc.) that contain network addresses (e.g., URLs) that lead to literature concerning company products and/or services. In such a case, each code, and therefore each address, could be accompanied by a brief description that identifies the associated file or files that will be printed if the code is read by a suitable printing device.

In another application, a given printing device could be sold with a list of various codes that, when read, cause the printing device to print one or more user manuals that pertain to the printing device and its operation. In a further application, the employees of a given company could distribute business cards that include a code or magnetic strip that contains the network address of one or more files pertinent to the company and/or the employee. In yet another application, a company's invoices could include a code that contains the network address of a file that contains detailed information about the transaction that is the subject of the invoice. Furthermore, in another application, airplane tickets could include one or more codes that contain the network address of one or more files that contain detailed information about the status of the flight(s) the user is scheduled to take, the user's itinerary, etc. In such a scenario, the user could, for instance, use a public printing device 102 that is located in the airport (e.g., at a public kiosk). Persons having ordinary skill in the art will appreciate that myriad other applications are feasible.

Figure 6:
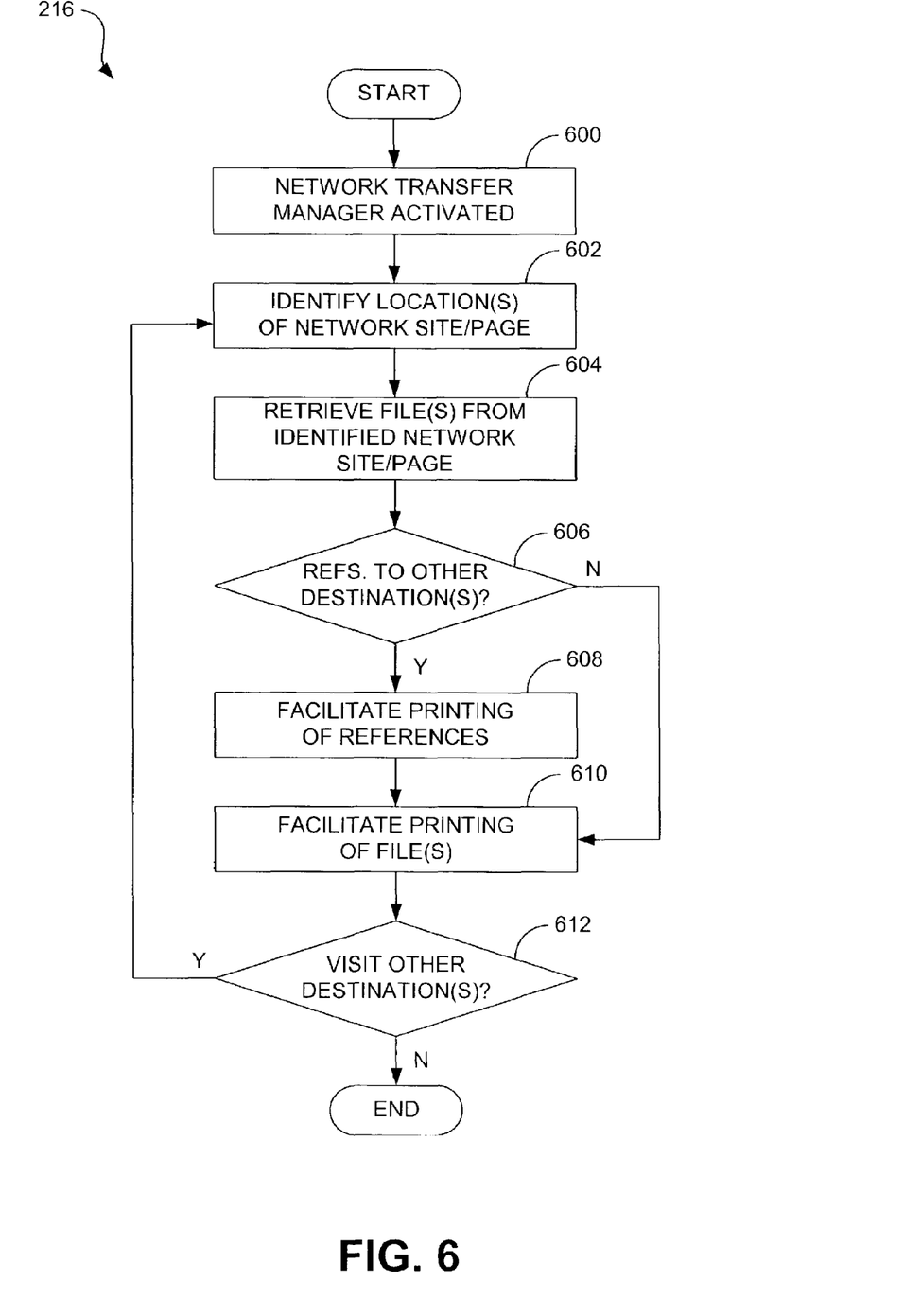
FIG. 6 is a flow diagram that illustrates a second example of operation of the network transfer manager of the printing device shown in FIG. 2.

In addition to retrieving and printing individual files that are accessible over a network, the printing device 102 can also be used to "surf" the network 112 in a manner of speaking. An example of such operation is illustrated in FIG. 6. Beginning with block 600, the network transfer manager 216 is activated. This activation occurs in similar manner to that described above in relation to FIG. 5. Once the network transfer manager 216 is activated, it can then identify the location of a network site or page, for instance, a web site or web page, that the user would like to "visit" by printing, as indicated in block 602. Again, this location can be identified with a network address such as a URL that has been provided to the printing device 102 by the user.

Once the location of the network site or page has been identified, the network transfer manager 216 can retrieve one or more files associated with the site or page, as indicated in block 604. By way of example, the files may comprise HTML files that are assembled together to form the network site or page. In addition, the files may include one or more image files for which network addresses are provided. As is discussed below, all of the various files associated with the network site or page can later be reassembled by the network transfer manager 216 prior to printing.

After the file or files has/have been retrieved, it can be determined whether the network site or page contains references to other network destinations, as indicated in decision element 606. By way of example, these references may comprise other network addresses (e.g., URLs) to other sites or pages. If not, flow continues down to block 610 described below. If such references exist, however, the manager 216 can facilitate printing of the references with the printing device 102, as indicted in block 608. For instance, the various references can be provided on one or more sheets of paper output by the printing device 102. The references typically are in a format that facilitates their input into the input device of the printing device 102. For example, where the input device comprises an actual or virtual keyboard, the references may merely be provided in a list of addresses. Alternatively, where the input device is configured to read codes, the references can comprise bar codes or two-dimensional codes that separately contain the addresses. Optionally, the references can further include brief descriptions of the destinations that have been downloaded to the printing device 102 from the host of the original network site or page (e.g., a network server).

In addition to facilitating printing of a list of the various references, the network transfer manager 216 further, in block 610, facilitates printing of the file or files that were retrieved in block 604. The various files are reassembled by the manager 216 prior to printing so that the hard copy document that is generated is representative of the network site or page (or other destination) that would be viewed by the user had the site or page been accessed using a computer network browser. With this hard copy document and the list of references, the user can then determine whether to "visit" another destination, as indicated in decision element 612. If so, the user can input the address information for that other destination (e.g., other network site or page) into the input device of the printing device 102, so that one or more other files, as well as further references, will be printed in similar manner to that described above. With this mode of operation, the user can more or less surf the network to visit a plurality of different network sites or pages by printing them sequentially with the printing device 102.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A method for browsing a network with a printing device having an input device integral to the printing device, the input device configured to allow a user to input information directly to the printer independent of any device connected to the printer, the method comprising:
    the printing device receiving a network address of a first network destination through the input device;
    the printing device printing a hard copy document of at least one file associated with the first network destination to provide a representation of the first network destination; and
    the printing device printing a hard copy document that includes information regarding a location of a second network destination that is referred to by the first network destination.

2. The method of claim 1, wherein printing a hard copy document that includes information comprises printing a hard copy document that includes a code that contains a network address of the second network destination.

3. The method of claim 2, further comprising receiving the network address contained within the code and printing a hard copy document of at least one file associated with the second destination to provide a representation of the second destination, and printing a hard copy document that includes information regarding a location of a third network destination that is referred to by the second network destination.

* * * * *